Jan. 5, 1932.  F. L. MARKEY  1,839,981
AMUSEMENT DEVICE
Filed Dec. 18, 1928   2 Sheets-Sheet 1

INVENTOR
Fred L. Markey,
BY
ATTORNEY

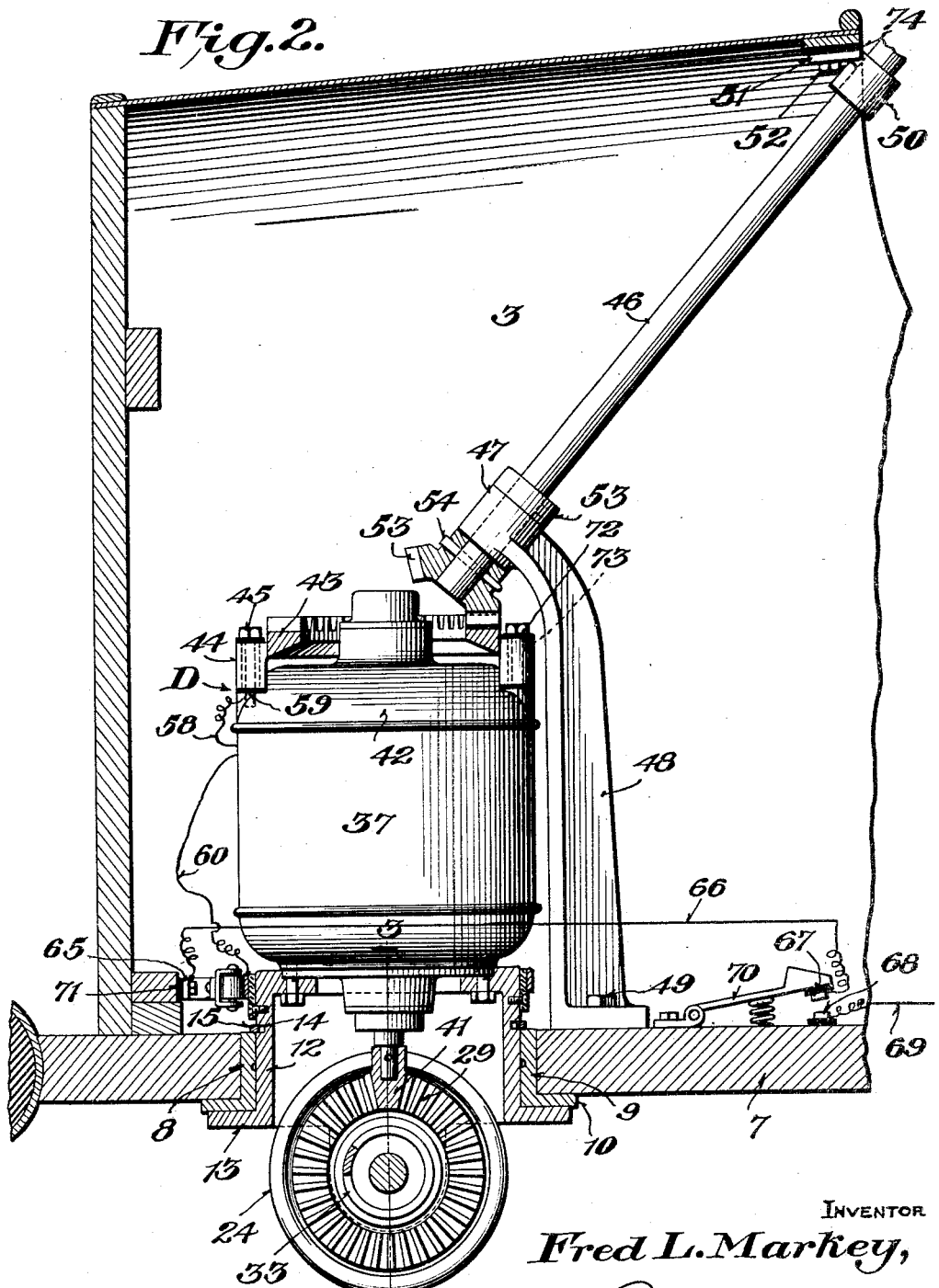

Patented Jan. 5, 1932

1,839,981

UNITED STATES PATENT OFFICE

FRED L. MARKEY, OF LAWRENCE, MASSACHUSETTS, ASSIGNOR TO DODGEM CORPORATION, OF LAWRENCE, MASSACHUSETTS, A CORPORATION OF MASSACHUSETTS

AMUSEMENT DEVICE

Application filed December 18, 1928. Serial No. 326,852.

This invention relates to an improvement in amusement apparatus of the general type illustrated in the Stoehrer Patents No. 1,373,108, March 29, 1921; 1,467,959, September 11, 1923; 1,478,979, December 25, 1923; and 1,652,840, December 13, 1927, and further illustrated in my co-pending application, Serial No. 317,955, filed Nov. 8th, 1928, now Patent No. 1,772,220, dated Aug. 5, 1930.

A primary object of the invention is to provide a novel and practical combined guiding and driving construction which represents a carrying forward of the idea shown in the Stoehrer Patent No. 1,373,108 wherein the guiding and traction units are combined to provide for the control of the car.

A further object of the invention is to provide a unit located at the front of the car in which the motor rotates with the steering and driving wheels. In my co-pending application, the motor is mounted on a stationary frame, whereas according to the present embodiment of the invention the motor and the steering wheels are mounted on a common support, and the steering effort from the steering column to the guiding wheels is imparted to the latter directly through the motor casing. This arrangement has the advantage of simplicity as well as practicability and reliability both from the standpoint of general use and also maintenance and repair.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which:—

Figure 2 is an enlarged vertical sectional view of the combined driving and steering unit.

Similar reference characters designate corresponding parts throughout the several figures of the drawings.

Figure 1:
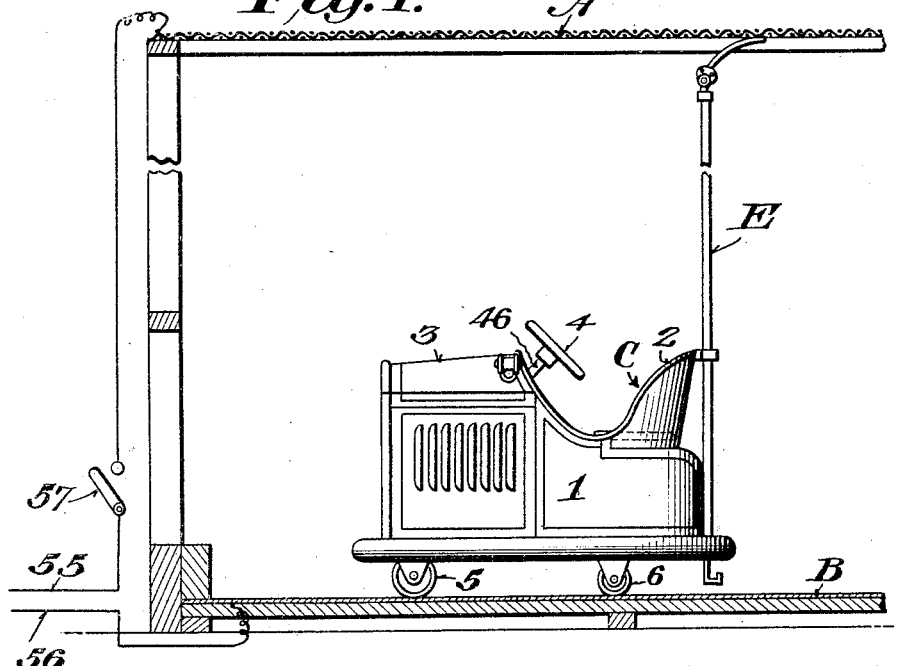
Figure 1 is a view illustrating the use of the present car in combination with an overhead electrically charged ceiling and an electrically charged floor.

As previously indicated the present invention is adapted for use in connection with an amusement outfit which includes an electrically charged overhead wire mesh ceiling, or the like, A, and a metallic floor B, also electrically charged, on which a car, or the like, designated generally as C travels when propelled by the prime mover D. This prime mover is supplied with current by being connected with the charged ceiling through the medium of the trolley E and to the charged floor B by being grounded to the combined driving and steering carriage F.

Specifically referring to the car C it will be seen that the same has the general appearance of an automobile for it includes a body portion 1, a seat 2 of a proper size to accommodate as many persons as desired, a hood 3, a steering wheel 4, and supporting and guiding wheels 5 and 6.

Figure 3:
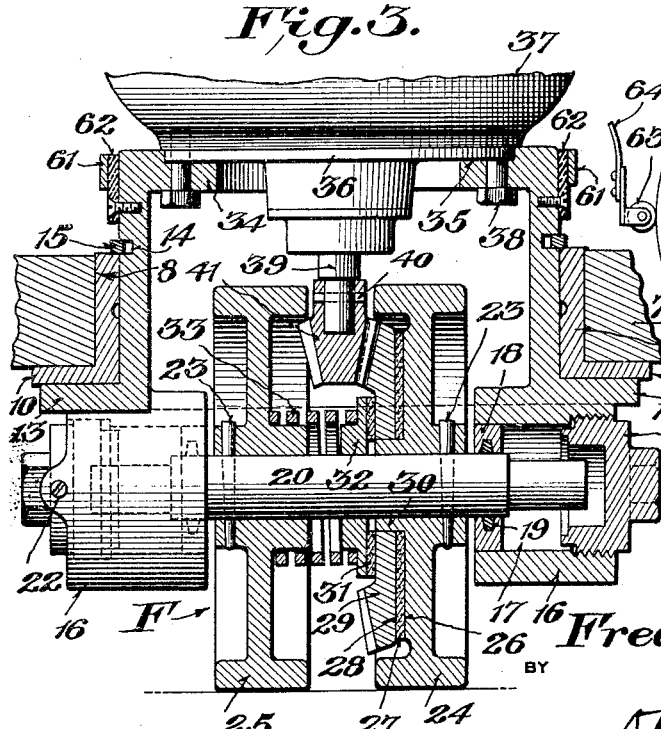
Figure 3 is a detail vertical sectional view illustrating more clearly the driving connection between a prime mover and traction and supporting wheels.
Figure 4:
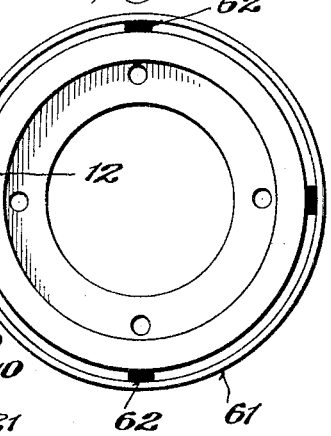
Figure 4 is a detail plan view of a collector ring for the prime mover and the mounting for the same ring.

Referring specifically to Figs. 2 and 3, it will be seen that the car is provided with a floor 7 having formed therein a hole 8 located beneath the hood 3. Positioned within the hole is a bearing 9 that is formed with a radial flange 10. This bearing is retained in place by any suitable means, not specifically disclosed. The bearing acts as a support for the combined driving and steering unit which specifically embodies this invention.

Mounted to rotate within the bearing 9 is the annular body portion 12 of a casting which forms the base for the said combined unit. This body portion 12 is formed with a radial flange 13 arranged to underlie the flange 10 formed on the bearing 9. For the purpose of retaining the base properly positioned within the bearing 9, the said bearing has a groove 14 which receives the split ring 15. The ring 15 will not prevent desired free rotation of the base with respect to the bearing 9. The ring, however, will prevent the base from dropping out of the bearing should the front end of the car be lifted.

Depending from the flange 13 of the base are the diametrically positioned, axially aligned bearing boxes 16 which are illustrated in the various figures as being formed integral with the base. It is to be understood, however, that these boxes may be formed separate from the base if so desired.

Figure 3 discloses one of these boxes as having a bore 17 of substantially cylindrical formation and as being open at both ends. The inner end of the bore 17 is closed by a ring 18 having the packing ring 19 positioned therein to engage the axle 20 for acting as a seal between the axle and the said ring. The outer end of the bore 17 is closed by a cap 21 which is threadedly connected to the bearing boxes. A set screw 22 is employed for retaining each of these caps against accidental displacement. The unoccupied space within the bearing boxes is intended to receive lubricant, such as cup grease, or the like.

Keyed to the axle 20 by means of the pins 23 are the combined driving and steering wheels 24 and 25. These wheels may be of any desired shape but preferably they will consist of disc-like webs with flanged peripheries. The wheel 24 is formed with a concentric friction clutch face 26 adapted to cooperate with the composition friction disc 27 interposed between this face 26 and the adjacent friction face 28 of the loose bevel ring gear 29. This gear is loosely mounted upon the extension 30 of the hub of the wheel 24. The opposite face of the ring gear 29 is cooperatively associated with a composition friction disc 31 which is interposed between this said face of the ring gear 29 and a metallic disc 32 loosely encircling the central portion of the axle 20. A compression spring 33 encircles the axle 20, a hub portion of the wheel 25 and a hub portion of the disc 32. This spring functions to connect the ring gear 29 to the wheel 24 so that by driving the ring gear, the wheel 24 will be driven. The spring 33, however, will enable the bevel ring gear to slip when an overload, such as the car striking a non-yielding body, is placed upon the motor.

The body portion 12 of the base of the combined driving and steering unit is formed with an annular flange 34 at its upper edge which projects radially inwardly from the base. This flange is provided with an annular pocket 35 for receiving the endbell 36 of the electric motor 37. For the purpose of removably retaining the motor in place upon the flange 34, screws, or the like, 38 are passed through suitable apertures formed in the flange and are threaded into the motor. The armature shaft 39 of the motor 37 has secured thereto, as by means of the pin 40 a bevel pinion 41 which constantly meshes with the bevel ring gear 29.

It now will be seen that there is provided a driving unit consisting of a motor 37 connected to a traction wheel 24 through the medium of a friction clutch structure which will yield or permit slippage when an overload is placed upon the motor. Due to the fact that both of the wheels 24 and 25 are rigidly connected to the axle 20, the driving of one wheel will of course cause the other wheel to be driven and both of the wheels will act as traction means for the car C.

For the purpose of steering the car, the entire combined driving and steering unit F is rotatable with respect to the car. For the purpose of providing a control for the steering movement of the unit, the upper endbell 42 of the motor 37 has secured thereto a ring gear 43. The mounting means for this gear consists of ears 44 which are attached to the endbell 42 by means of screws, or the like, 45. A steering column 46 is journaled in the upper end 47 of a bracket 48 which is secured at its lower end to the floor 7 by means of screws or the like 49. Adjacent the upper end of the steering column, a bracket 50 acts as a support for the column. The bracket is secured at 51 to the top wall of the hood 3 by means of screws or the like 52. Fig. 1 discloses the fact that a steering wheel 4 is properly mounted upon the upper end of the steering column 46. A collar 53 is suitably fastened to the column 46 for preventing axial downward movement of the column 46 with respect to the bracket 48. A bevel pinion 53 is connected to the lower end of the steering column 46 by means of a pin 54. This pinion 53 is constantly in mesh with the ring gear 43 mounted upon the motor 37.

It now will be seen that by rotating the steering column 46 through the medium of the steering wheel 4 the motor 37 will be rotated. Due to the fact that the motor and the base 12 are immovable with respect to each other, rotation of the motor will cause the base to rotate within the bearing 9. The traction wheels 24 and 25 of course will rotate with the base and steering of the car thereby will be provided.

It has been stated above that the wire mesh ceiling A and the metallic floor B are charged with electricity. For the purpose of accomplishing this, the line wires 55 and 56 are connected respectively with the ceiling and floor. A master switch 57 is located in one of these line wires. For the purpose of conducting the current from the line wires, or more specifically from the charged ceiling and floor, to the motor, the motor lead 58 is grounded to the motor casing at 59. This grounding of the lead 58 to the motor casing of course establishes a ground connection with the metallic floor B. The remaining lead 60 for the motor is connected to a collector ring 61 which is secured to the base 12 adjacent its upper end. For the purpose of insulating the collector ring 61 from the base 12, a plurality of insulator blocks 62 are arranged between the base and the ring. Constantly engaging the collector ring 61 is a roller 63 mounted upon a spring arm 64 which is connected to the body of the car at 65. A wire 66 is connected to the mounting for the arm 64 and this wire 66 extends to a contact 67 operatively associated with a second contact 68. A wire 69 runs from this second contact to the trolley E. The specific connection between the wire 69 and the trolley is not disclosed in view of the fact that any suitable form of connection may be provided. In the present illustration, the contact 67 is connected to a pedal 70 by means of which the contact 67 may be selectively placed in engagement with the contact 68.

For the purpose of insulating the current supplied to the motor from the occupant or occupants of the car, the arm 64 is insulated from the vehicle by the insulating material 71. The ring gear 43 is insulated from the motor by means of insulating washers 72 and insulating tubes 73 which are interposed between the screws 45 and the ears 44. The bracket 52 is insulated from the hood 3 of the car body by means of an insulating block 74.

It now will be seen that when the master switch 57 has been closed to charge the ceiling A and the floor B, an occupant of the illustrated car may connect his motor 37 in circuit with the charged ceiling and floor by placing the contacts 67 and 68 in engagement with each other. The closing of this individual car switch will energize the motor 37 and will cause its armature shaft to rotate for driving the traction wheels 24 and 25. Due to the dirigible mounting of these wheels, the direction of travel of the car may be controlled by turning the steering wheel 4. It is apparent that the combined steering and driving unit may be turned so that the vehicle may be steered in almost any desired direction. As a matter of fact, the mounting of the motor 37 with its axis co-extensive with the axis of rotation of the combined steering and driving unit will permit the unit to be turned 180° for entirely reversing the direction of travel of the car. During the travel of the car over the charged floor B, the overload friction clutch interposed between the motor 37 and the traction wheels will permit of slipping to occur should progress of the car be checked by running into a nonyielding obstacle, such as the wall of the enclosure for the amusement device or another car operating upon the floor.

From the foregoing, it will be apparent that the present invention provides a combined driving and steering unit wherein the entire unit is rotatable with respect to the car for the purpose of controlling the direction of movement of the latter and wherein the prime mover or electric motor is arranged coaxial with respect to the axis of rotation of the unit whereby a very compact, simple structure is provided. The locating of the combined driving and steering unit at the front end portion of the car, or in spaced relation with respect to the occupant's seat, permits of a better distribution of the load with relation to the tractive effort of the combined unit which not only contributes toward easier steering but also assists in lightening the burden imposed upon the motor by frequent stopping and starting to manipulate the car when in use.

Without further description, it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. An amusement device of the class described comprising a car, a member mounted on the car for rotation on a vertical axis with respect thereto, a combined driving and steering wheel carried by and rotatable on a horizontal axis with respect to said member, a motor mounted rigidly on said member with its axis disposed vertically and having a driving connection with said wheel, a gear mounted directly on the motor, a steering shaft supporting bracket mounted on the car adjacent to said motor and extending vertically upward by the side of the latter and provided at its upper end with a steering shaft bearing, an inclined steering shaft rotatably mounted in the bearing of said bracket, and a gear carried by said steering shaft and disposed in mesh with the gear carried by the motor.

2. An amusement device of the character described comprising a car inclusive of a floor having an opening formed therein, a bearing member mounted in said opening, a motor support mounted in said bearing for rotation on a vertical axis, an outwardly directed flange on said motor support cooperating with the lower end of the bearing member to prevent upward movement of said support, said support having an annular groove above said bearing, a ring disposed in said groove cooperating with the upper end of said bearing to prevent downward movement of the motor support, a combined driving and steering wheel carried by said motor support, a motor mounted rigidly on said support with its axis disposed vertically and having a driving connection with said wheel, a gear carried by said motor, a bracket extending vertically upward from the floor and provided at its upper end with a bearing, an inclined steering shaft rotatably mounted in the bearing of said bracket, and a gear carried by said steering shaft and disposed in mesh with the gear carried by the motor.

In testimony whereof I hereunto affix my signature.

FRED L. MARKEY.